United States Patent
Smith et al.

(10) Patent No.: US 6,539,073 B1
(45) Date of Patent: Mar. 25, 2003

(54) NUCLEAR FUEL BUNDLE HAVING SPACERS CAPTURED BY A WATER ROD

(75) Inventors: David G. Smith, Leland, NC (US); William C. Peters, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/505,861

(22) Filed: Feb. 17, 2000

(51) Int. Cl.$^7$ .................................................. G21C 3/34
(52) U.S. Cl. ..................... 376/439; 379/438; 379/443
(58) Field of Search ............................... 376/439, 449, 376/353, 438, 442, 448, 441, 446, 261, 444, 443

(56) References Cited

U.S. PATENT DOCUMENTS

| | | | | |
|---|---|---|---|---|
| 3,015,616 A | * | 1/1962 | Sturtz et al. ................. | 376/446 |
| 3,359,449 A | * | 12/1967 | Trask .......................... | 376/327 |
| 3,725,199 A | * | 4/1973 | Notari et al. ................ | 376/353 |
| 3,787,286 A | * | 1/1974 | Anthony ...................... | 176/78 |
| 3,954,560 A | * | 5/1976 | Delafosse et al. ........... | 376/446 |
| 4,313,797 A | * | 2/1982 | Attix ........................... | 376/441 |
| 4,675,154 A | * | 6/1987 | Nelson et al. ............... | 376/444 |
| 5,009,837 A | * | 4/1991 | Nguyen et al. .............. | 376/261 |
| 5,174,949 A | * | 12/1992 | Johansson ................... | 376/439 |
| 5,180,550 A | * | 1/1993 | Nylund ....................... | 376/449 |
| 5,229,068 A | | 7/1993 | Johansson et al. ........... | 376/371 |
| 5,491,733 A | * | 2/1996 | Patterson et al. ............ | 376/443 |
| 5,553,108 A | * | 9/1996 | Johansson .................... | 376/444 |
| 5,727,039 A | * | 3/1998 | Harmon et al. .............. | 376/442 |

OTHER PUBLICATIONS

ATRIUM Fuel Assemblies for Boiling Water Reactors, 1993, Siemens Power Corporation.*
Fuel Assemblies References '97, 1997, Siemens Power Corporation.*

* cited by examiner

Primary Examiner—Michael J. Carone
Assistant Examiner—Daniel Matz
(74) Attorney, Agent, or Firm—Nixon & Vanderhye

(57) ABSTRACT

Water rod segments are provided in a nuclear fuel bundle and releasably connected one to the other at joints within openings through the spacers. A lowermost water rod segment passes through a number of the spacers, with water rods segments above the lowermost segment being screwthreaded one to the other forming joints therebetween within the spacer openings. Capture flanges are provided immediately above and below the spacers on each of the segments such that the spacer is captured between adjoining segments. Interior passages through the segments communicate water along the water rod to an upper region of the fuel bundle. Swirler vanes are disposed about the water rod segments and terminal ends of the swirler vanes may form the capture flanges, retaining the spacer between adjacent segments.

22 Claims, 4 Drawing Sheets

NUCLEAR FUEL BUNDLE HAVING SPACERS CAPTURED BY A WATER ROD

BACKGROUND OF THE INVENTION

The present invention relates to nuclear fuel bundles having one or more water rods interconnecting upper and lower tie plates and particularly water rods having capture flanges for capturing one or more spacers to form a structural skeleton for the nuclear fuel bundle.

A typical boiling water nuclear reactor has a reactor core comprised of a plurality of fuel bundles in side-by-side relation to one another. Coolant moderator flows upwardly within the fuel bundles and about the fuel rods within the fuel bundles and is converted to steam to produce power. The fuel rods are located between upper and lower tie plates and are laterally spaced from one another by spacers having openings for receiving the fuel rods and forming a matrix of fuel rods. The spacers are vertically spaced one from the other and may be structurally carried on water rods which transmit water from a lower portion of the fuel bundle for egress into an upper steam vent volume portion of the fuel bundle.

Water rods have also been used to improve moderator distribution by the incorporation of swirl vanes about the water rods. For example, in U.S. Pat. No. 5,229,068, of common assignee herewith, a generally helical extending swirl vane is mounted on a water rod and extends upwardly along the fuel bundle from a location within a spacer and through one or more additional spacers to the upper regions of the fuel bundle. In certain fuel bundles, spacers are sometimes captured between a pair of vertically spaced tabs formed on the water rod. Tabbed water rods, however, lead to difficulties in the fabrication of the fuel bundle. Additionally, oftentimes the spacers and/or fuel rods and water rods are marred or scratched during assembly of the fuel bundle, which can often lead to failure and corrosion of the component part. Accordingly, there is a need to provide a nuclear fuel bundle having one or more water rods which can capture the spacers as well as to distribute the water moderator in the bundle onto the adjacent fuel rods and into the interstices thereof.

BRIEF SUMMARY OF THE INVENTION

In accordance with a preferred embodiment of the present invention, there is provided a water rod constructed in segments having interior passages in communication with one another at adjoining ends for transmitting water along the length of the water rod into the upper regions of the fuel bundle. The water rod segments are sized and configured relative to the openings in the spacers through which the water rod passes to capture the adjoining spacer, precluding substantial movement thereof along the fuel bundle. To accomplish this, the segments of the water rod are provided at adjacent ends thereof with male and female threaded connections, respectively, whereby the water rod can be assembled. The segment ends on opposite sides of the spacer through which the water rod passes have capture flanges which project beyond the peripheral confines of the openings in the spacers through which the water rod extends. Preferably, the capture flanges are in the form of the ends of swirler vanes extending along the outer periphery of the water rod segments between adjacent spacers. Consequently, not only are the spacers captured by the water rod segments but the flow of water about the water rods is directed in a radial direction against the adjacent fuel rods and into the interstices of the adjacent fuel rods.

In a preferred embodiment according to the present invention, there is provided a fuel bundle for a nuclear reactor comprising a plurality of spacers spaced one from the other along the bundle and having a plurality of openings, a plurality of fuel rods extending through the openings in the spacers, at least one water rod extending through a predetermined opening through each of the spacers and generally parallel to the fuel rods, the water rod including first and second water rod segments secured to one another, the segments having interior passages in communication with one another for transmitting fluid along the one water rod, the segments having elements on opposite sides of the one spacer and extending beyond peripheral confines of the predetermined opening for engaging the one spacer between the elements and preventing substantial movement of the spacer along the fuel bundle.

In a further preferred embodiment according to the present invention, there is provided a fuel bundle for a nuclear reactor comprising a plurality of spacers spaced one from the other along the bundle and having a plurality of openings, a plurality of fuel rods extending through the openings in the spacers, at least one water rod extending through a predetermined opening through each of the spacers and generally parallel to the fuel rods, the water rod including first and second water rod segments secured to one another at a joint located within the predetermined opening of one of the spacers, the segments having interior passages in communication with one another at the joint for transmitting fluid along the one water rod, the segments having capture flanges on opposite sides of the one spacer and extending beyond peripheral confines of the predetermined opening for capturing the one spacer between the flanges and preventing substantial movement of the spacer along the fuel bundle.

DETAILED DESCRIPTION OF THE INVENTION

Figure 1:
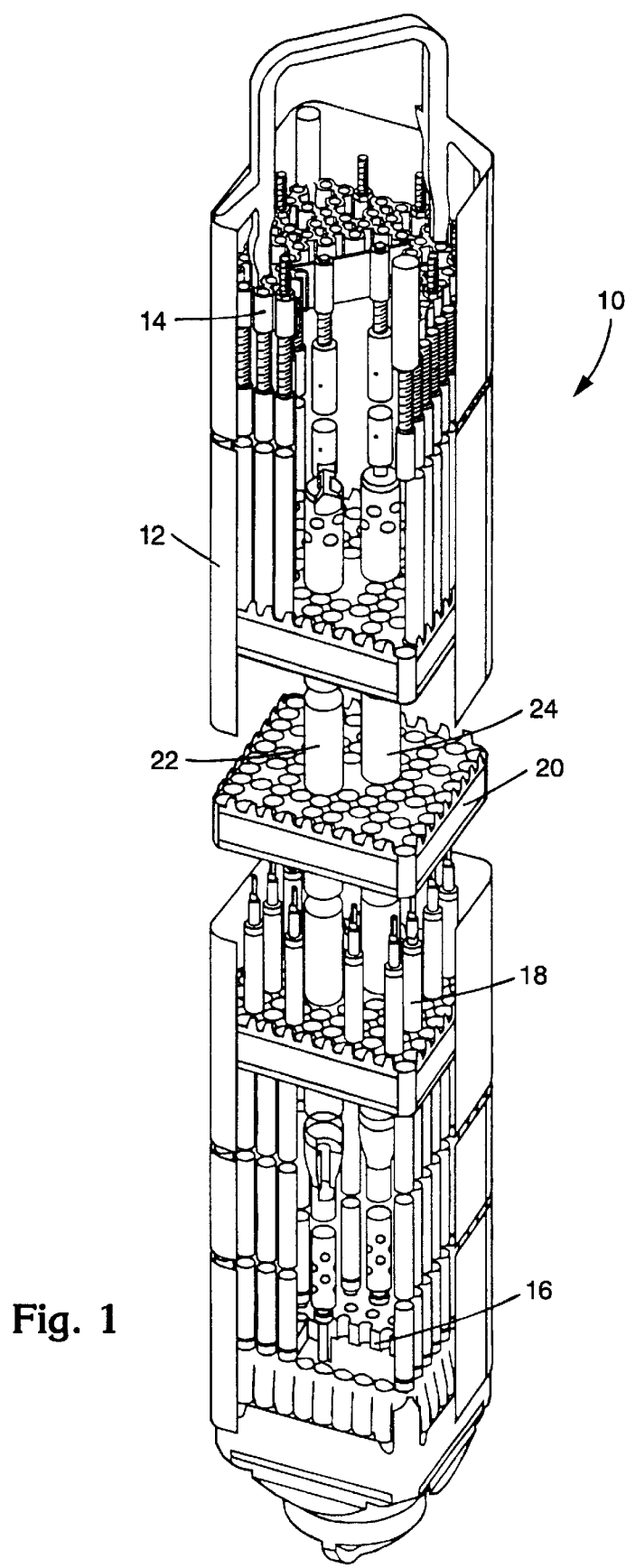
FIG. 1 is a perspective view of a representative fuel bundle having segmented water rods constructed in accordance with the present invention.
Figure 1A:
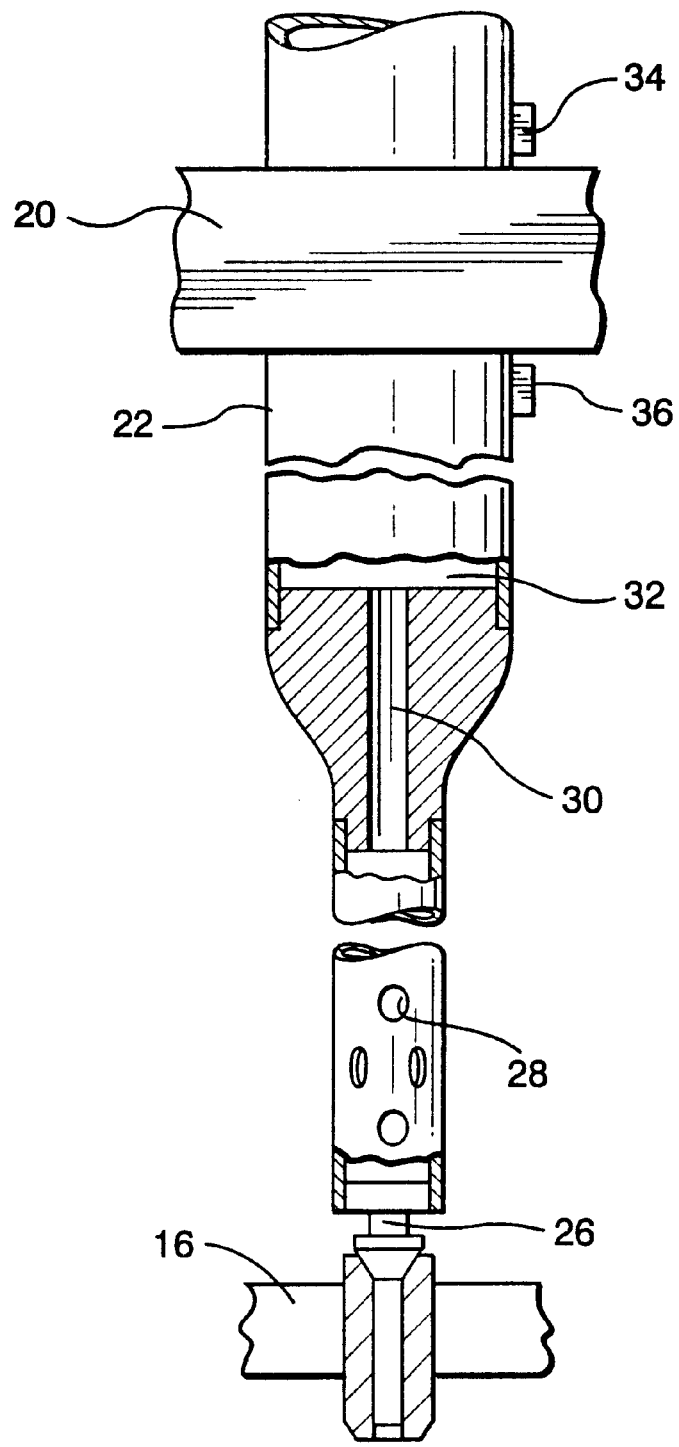
FIG. 1A is a fragmentary cross-sectional view of the lower end of a water rod with parts broken out and in cross-section.

Referring now to the drawing figures, particularly to FIG. 1, there is illustrated a nuclear fuel bundle, generally designated 10. Bundle 10 includes an outer channel 12 surrounding an upper tie plate 14 and a lower tie plate 16. A plurality of fuel rods 18 are disposed in a matrix within the fuel bundle 10 and pass through a plurality of spacers 20 vertically spaced one from the other maintaining the fuel rods in the predetermined matrix thereof. In the illustrated form of FIG. 1, the matrix is a 10×10 array. A pair of water rods 22 & 24 are disposed in the fuel rods between the lower tie plate 16 and the upper tie plate 14. The water rods serve to transfer moderator fluid from the lower regions of the nuclear fuel bundle to the upper regions, where the water is dispersed through openings in the water rod for flow into the bundle in and about the fuel rods as illustrated in FIG. 1A, the lower tie plate 16 receives end plugs 26 formed on the lower ends of the water rods. The lower ends of the water rods have openings 28 for receiving moderator fluid for flow upwardly within the water rod through passages 30 for flow into passageways 32 formed by the tubular portions of the water rod 22. As illustrated in FIG. 1A, the spacer 20 is bounded by a pair of radially directed flanges 34 and 36 which lie on opposite sides of the spacer 20, maintaining the spacer at the desired elevation along the water rod.

Figure 1B:
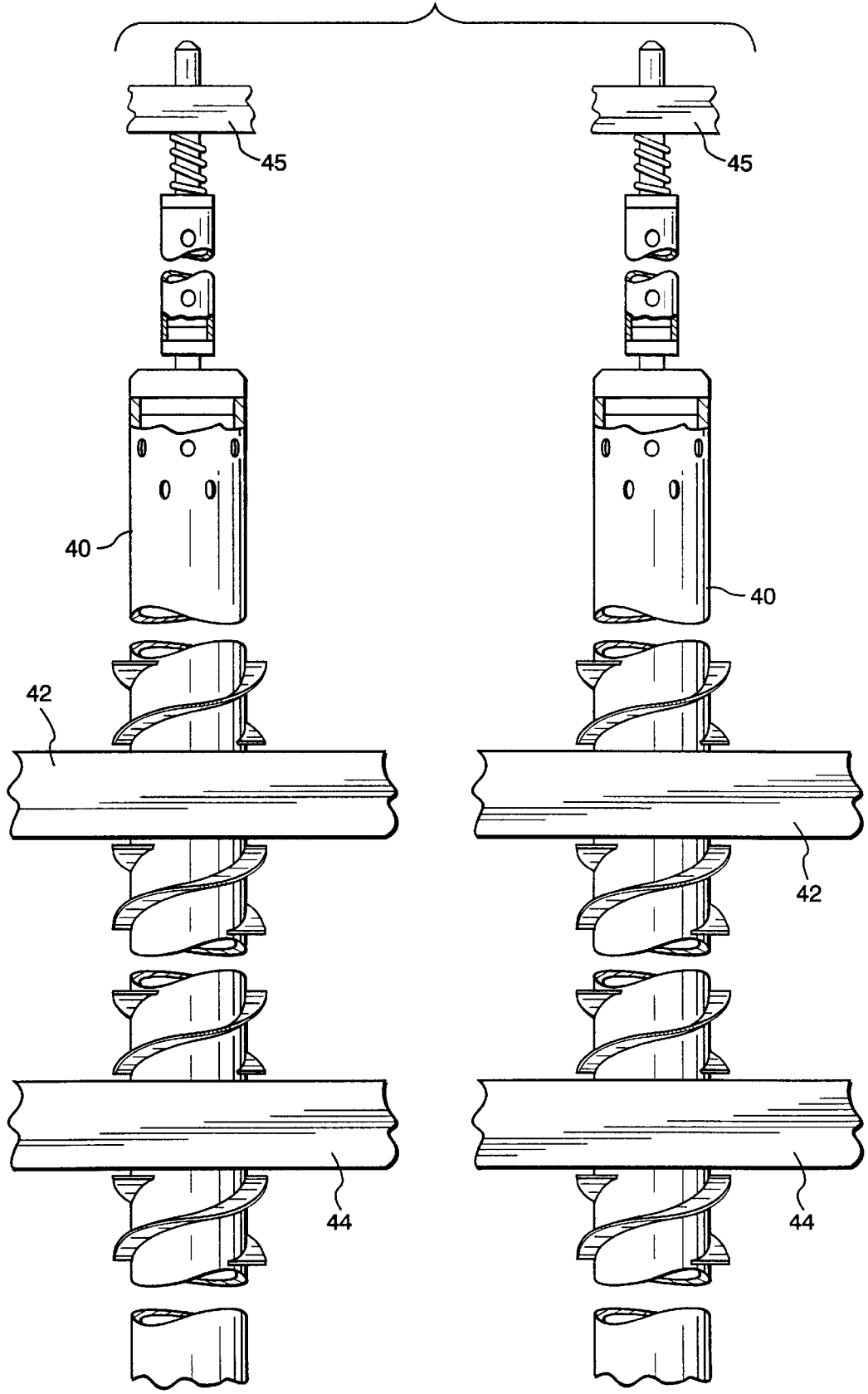
FIG. 1B is a fragmentary side elevational view of an upper region of a pair of water rods constructed in accordance with the present invention.

Referring now to FIG. 1B, at least one and preferably a pair of water rods 40 are illustrated passing through vertically adjacent spacers 42 and 44. The upper ends of the water rods 40 terminate in end guides which are received in the upper tie plate 45 of the fuel bundle. The spacers 42 and 44 comprise two of a plurality of spacers, typically between five and seven spacers, spaced along the entire length of the fuel bundle for maintaining the fuel rods in the desired array thereof. The spacers 42 and 44 useful with the present invention may comprise any type of spacers, for example, ferrule-type spacers or spacers of the type described and illustrated in U.S. Pat. No. 5,209,899

Figure 2:
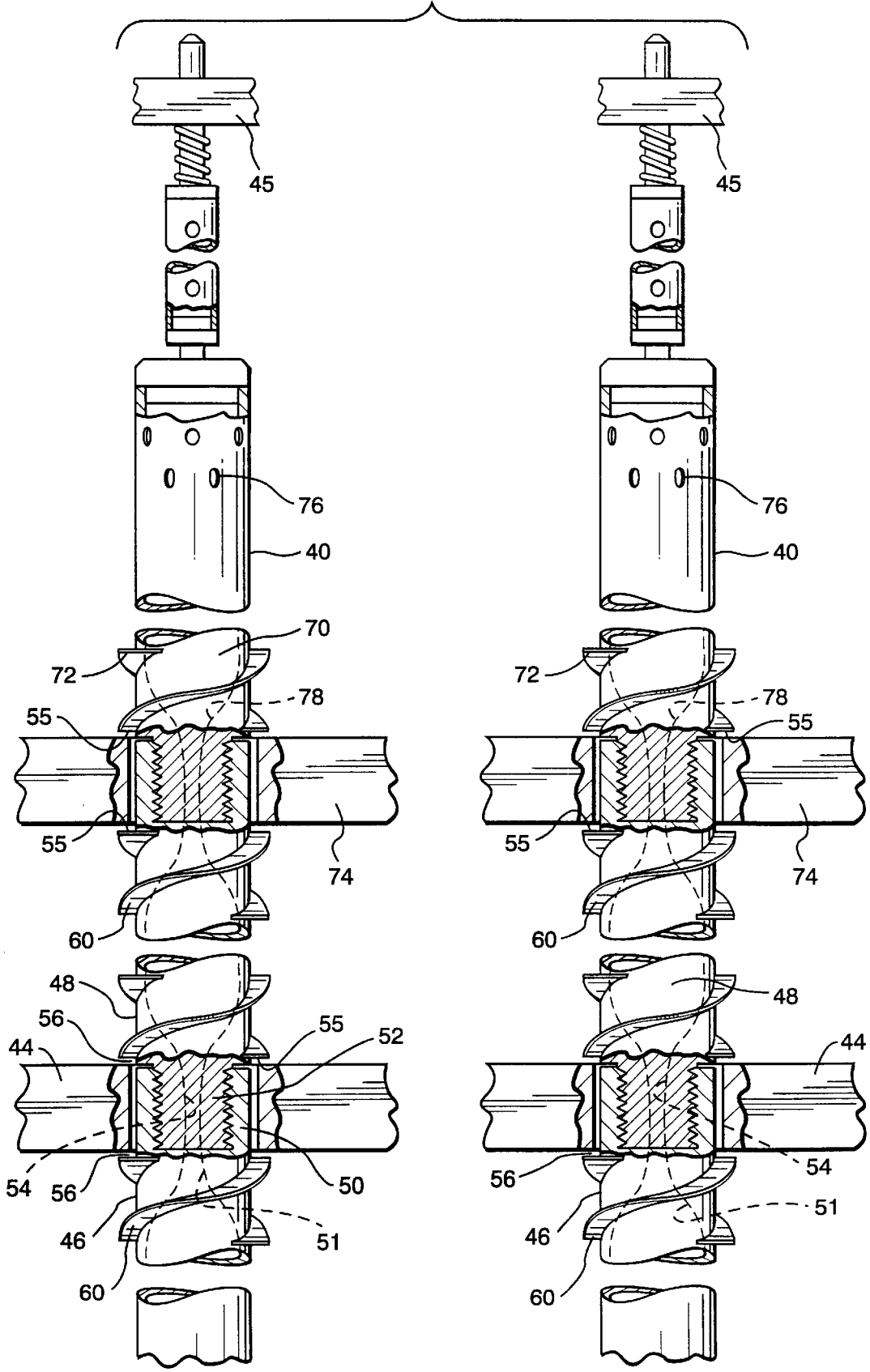
FIG. 2 is a view similar to FIG. 1B with parts broken out and in cross-section illustrating the joints between the water rod segments.

In the present invention, however, and instead of forming a unitary water rod throughout its entire height between the upper and lower tie plates, the water rod may be formed of two or more water rod segments. For example, and referring to FIG. 2, the water rods 40 may comprise a series of water rod segments interconnected one to the other at adjoining ends. For example, as illustrated in FIG. 2, a water rod segment 46 may have an upper end joined to the lower end of the next-adjacent upper water rod segment 48. The upper end of segment 48 may be joined to the lower end of an additional water rod segment. The process may be repeated until eventually the upper end of the final water rod segment is secured to the upper tie plate. The joints between the adjoining segments are disposed within the openings provided in the spacer through which the water rod extends. For example, the upper end of the segment 46 terminates in a female threaded nipple 50 which may be formed integrally with the segment 46 or formed separately and secured thereto as by threading or welding. The nipple 50 includes an axial passage therethrough in communication with the interior passage 51 of the underlying water rod segment 46. The adjoining upper water rod segment 48 has a male threaded plug 52 on its lower end for threaded engagement with the female threaded nipple 50. Like the nipple 50, the male plug has a central passage 54 through which moderator may flow from the lower segment to the upper segment.

In the illustrated form of the present invention, the water rod segments 46 and 48 capture the spacer, for example, spacer 44, therebetween. To accomplish this capture, the segments 46 and 48 have elements, e.g., capture flanges, which project laterally beyond the peripheral confines of the opening in the spacer through which the water rod extends. Thus, for example, the diameter of the overlying and underlying water rod segments 48 and 46, respectively, may be larger than the diameter of the opening through the spacer. By employing a threaded connection between the adjoining two segments, the spacer can be assembled onto the water rods by inserting the nipple 51 and male plug 52 through the opening and threading the segments one to the other. The enlarged diameter portions of the upper and lower segments thus lie in registry with portions of the spacer laterally of the spacer opening and capture the spacer therebetween. Preferably, a small clearance 56 is provided between the enlarged diameter portions and the spacers to accommodate thermal expansion and contraction of the spacer relative to the water rod.

In a preferred form of the present invention, the capture flanges may comprise terminal portions of swirler vanes 60 extending externally about the water rod segments 46 and 48. As illustrated in FIG. 2, the swirler vanes form a double helix about the water rod segments, although a single helix or helices in excess of two helices may be used. Ends of the swirler vanes extend beyond the lateral confines of the opening of the spacer, e.g., spacer 44, and on opposite sides thereof to capture the spacer. With a double helix, the ends of the vanes are diametrically opposite and form diametrically opposite stops or flanges 55 engageable by the captured spacer. Where a single helix is employed, only one stop is used, although an additional tab or stop can be used, preferably diametrically opposite the end of the swirler vane. It will be appreciated that the swirler vanes about the water rods serve to deflect moderator onto the adjacent fuel rods and into interstices thereof.

In a preferred embodiment of the present invention, a separate segment is provided for each axial spacer-to-spacer region above a lower segment, which may be of a standard water rod configuration and extend through the first two or more spacers in the lower region of the bundle. For example, a third segment 70 above segment 48 is illustrated at FIG. 2. Segment 70 preferably includes a swirler vane(s) 72 terminating at its lower end in stops engageable with the spacer 74. Openings 76 are also provided in the uppermost water rod segment, e.g., segment 70, to flow water from the lower region of the bundle via an interior passage 78 to the upper region of the bundle against and into the interstices between the fuel rods. By using the segmented water rod of the present invention, the water rod tabs previously used to capture the spacer are entirely eliminated. Moreover, the present invention provides an installation whereby damage, marring or scratching of the spacers and water rods is minimized or eliminated. It will be appreciated that with elongated water rods, the spacers are typically displaced along the water rods to their desired location in the bundle. In that displacement, there is potential for damaging the contacting parts of the spacer and water rod. However, in the present invention, the threaded couplings between the water rod segments within the openings of the spacers afford a construction which virtually eliminates any sliding action of the water rod and spacers relative to one another, hence eliminating the potential for damage to one or the other, or both, of the spacers and water rods. In short, the spacer cannot be dislodged from its location along the water rod.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle for a nuclear reactor comprising:

a plurality of spacers spaced one from the other along the bundle and having a plurality of openings;

a plurality of fuel rods extending through the openings in said spacers;

at least one water rod extending through a predetermined opening through each of the spacers and generally parallel to said fuel rods, said water rod including first and second water rod segments with ends secured to one another within a predetermined opening of one of said spacers, said segments having interior passages in communication with one another for transmitting fluid along the one water rod, said segments having respective elements on opposite sides of said one spacer and extending laterally beyond peripheral confines of said predetermined opening through said one spacer for engaging said one spacer between said elements and preventing substantial movement of said spacer along said fuel bundle.

2. A fuel bundle according to claim 1 wherein said element forms a part of a swirler vane on at least one side of said one spacer.

3. A fuel bundle according to claim 1 wherein said elements have a small clearance with said spacer whereby elements limit movement of said spacer along said water rod.

4. A fuel bundle according to claim 1 wherein said segments have male and female threaded ends threaded to one another within the one spacer opening.

5. A fuel bundle according to claim 1 including a third water rod segment, said first, second and third water rod segments being arranged one above the other in the fuel bundle, a lower end of the third segment and an upper end of said second segment being secured to one another at a second spacer spaced from the one spacer along said fuel bundle, said third segment having an interior passage in communication with the interior passage of said second segment for transmitting fluid along the water rod, the lower and upper ends of said third and second segments, respectively, having elements on respective opposite sides of said second spacer and extending laterally beyond peripheral confines of said predetermined opening through said second spacer for engaging said second spacer therebetween and preventing substantial movement of said second spacer along said fuel bundle.

6. A fuel bundle according to claim 1 wherein said second segment lies above said first segment and said second segment includes a plurality of openings for egress of fluid into the fuel bundle.

7. A fuel bundle according to claim 1 wherein said elements comprise swirler vanes on opposite sides of said one spacer.

8. A fuel bundle according to claim 7 wherein one of said swirler vanes extends along at least one of said water rod segments to an adjacent spacer such that the one swirler vane extends substantially the full height between said adjacent spacers.

9. A fuel bundle according to claim 1 wherein one of said elements forms a part of a swirler vane on at least one side of said one spacer, said segments having male and female threaded ends threaded to one another within the one spacer opening.

10. A fuel bundle according to claim 1 wherein said elements comprise swirler vanes on opposite sides of said one spacer, one of said swirler vanes extending along at least one of said water rod segments to an adjacent spacer such that the one swirler vane extends substantially the full height between adjacent spacers.

11. A fuel bundle for a nuclear reactor comprising:
a plurality of spacers spaced one from the other along the bundle and having a plurality of openings;
a plurality of fuel rods extending through the openings in said spacers;
at least one water rod extending through a predetermined opening through each of the spacers and generally parallel to said fuel rods, said water rod including first and second water rod segments with ends secured to one another at a joint located within the predetermined opening of one of said spacers, said segments having interior passages in communication with one another at said joint for transmitting fluid along the one water rod, said segments having respective capture flanges on opposite sides of said one spacer and extending laterally beyond peripheral confines of said predetermined opening for capturing said one spacer between said flanges and preventing substantial movement of said spacer along said fuel bundle.

12. A fuel bundle according to claim 11 wherein said capture flanges form parts of swirler vanes on opposite sides of said one spacer.

13. A fuel bundle according to claim 11 wherein said capture flanges have a small clearance with said spacer whereby the capture flanges limit movement of said spacer along said water rod.

14. A fuel bundle according to claim 11 wherein said segments have male and female threaded ends threaded to one another within the one spacer opening.

15. A fuel bundle according to claim 11 including a third water rod segment, said first, second and third water rod segments being arranged one above the other in the fuel bundle, a lower end of the third segment and an upper end of said second segment being secured to one another at a second joint located within said predetermined opening of another of said spacers along said fuel bundle, said third segment having an interior passage in communication with the interior passage of said second segment at said second joint for transmitting fluid along the water rod, the lower and upper ends of said third and second segments, respectively, having capture flanges on respective opposite sides of said another spacer and extending laterally beyond peripheral confines of said predetermined opening of said another spacer therebetween and preventing substantial movement of said another spacer along said fuel bundle.

16. A fuel bundle according to claim 11 wherein said second segment lies above said first segment and said second segment includes a plurality of openings for egress of fluid into the fuel bundle.

17. A fuel bundle according to claim 11 wherein said capture flanges comprise swirler vanes on opposite sides of said one spacer.

18. A fuel bundle according to claim 17 wherein one of said swirler vanes extending along at least one of said water rod segments to an adjacent spacer such that the one swirler vane extends substantially the full height between said adjacent spacers.

19. A fuel bundle according to claim 11 wherein said capture flanges form parts of swirler vanes on opposite sides of said one spacer, said segments having male and female threaded ends threaded to one another within the one spacer opening.

20. A fuel bundle according to claim 19 wherein said capture flanges comprise swirler vanes on opposite sides of said one spacer, one of said swirler vanes extending along at least one of said water rod segments to an adjacent spacer such that the one swirler vane extends substantially the full height between said adjacent spacers.

21. A fuel bundle according to claim 1 including a lower tie plate and an upper tie plate, said plurality of spacers being spaced between said upper tie plate and said lower tie plate and an outer channel surrounding said spacers, fuel rods and said water rod.

22. A fuel bundle according to claim 11 including a lower tie plate and an upper tie plate, said plurality of spacers being spaced between said upper tie plate and said lower tie plate and an outer channel surrounding said spacers, fuel rods and said water rod.

* * * * *